United States Patent [19]

Rümmler et al.

[11] Patent Number: 4,608,218

[45] Date of Patent: Aug. 26, 1986

[54] METHOD FOR THE VULCANIZATION OF PNEUMATIC TIRES

[75] Inventors: Karl-Heinz Rümmler, Hanover; Willi Sievers, Korbach; Karl-Henning Dette, Wulfsen; Lothar Köster, Hamburg; Romeo Luscalu, Buxtehude, all of Fed. Rep. of Germany

[73] Assignees: Continental Gummi-Werke AG, Hanover; Fried. Krupp GmbH, Essen, both of Fed. Rep. of Germany

[21] Appl. No.: 786,149

[22] Filed: Oct. 8, 1985

Related U.S. Application Data

[63] Continuation of Ser. No. 619,032, Jun. 11, 1984, abandoned.

[30] Foreign Application Priority Data

Jun. 10, 1983 [DE] Fed. Rep. of Germany ....... 3320963

[51] Int. Cl.$^4$ .............................................. B29H 5/02
[52] U.S. Cl. ..................................... 264/315; 425/29; 425/30; 425/40; 425/144; 425/384; 425/170
[58] Field of Search .................. 425/29, 30, 143, 144; 264/315

[56] References Cited

U.S. PATENT DOCUMENTS

| | | | |
|---|---|---|---|
| 3,649,729 | 3/1972 | Davis et al. | 264/315 X |
| 3,819,915 | 6/1974 | Smith | 425/29 X |
| 4,022,555 | 5/1977 | Smith | 425/29 |
| 4,044,600 | 8/1977 | Claxton et al. | 425/29 X |
| 4,344,142 | 8/1982 | Diehr et al. | 425/30 X |
| 4,371,483 | 2/1983 | Mattson | 425/30 X |

FOREIGN PATENT DOCUMENTS 2446023 4/1975 Fed. Rep. of Germany .

Primary Examiner—J. Howard Flint, Jr.
Attorney, Agent, or Firm—Karl F. Ross; Herbert Dubno

[57] ABSTRACT

A vulcanization method and press in which at time-spaced intervals of 1 to 40 seconds, temperature measurements representing increments of heat supplied to the vulcanizable body are taken of a medium used for vulcanization. A summation of the measurements continuously during the vulcanization process represents the heat supplied to the body and when the summed heat quantity equals the total heat quantity previously determined to be necessary for complete vulcanization, the process is terminated.

7 Claims, 6 Drawing Figures

METHOD FOR THE VULCANIZATION OF PNEUMATIC TIRES

This is a continuation of application Ser. No. 619,032 filed on June 11, 1984 now abandoned.

FIELD OF THE INVENTION

Our present invention relates to a method for the vulcanization of pneumatic tires in a tire press and, more particularly, to a method for controlling the vulcanization of tires in a vulcanization form to which a heating medium is fed for the internal and external heating of the tire body within the form, which has the contours of the tire to be pressed.

BACKGROUND OF THE INVENTION

It is not uncommon to build a tire by forming a carcass and applying the various layers of vulcanizable material to form the side walls and tread thereof to the carcass and introducing the tire body thus produced into a tire press which is closed upon and defines a mold or form complementary to the configuration of the tire to be produced.

The heating medium is supplied to the form in the press and heats the vulcanizable rubber composition within the form from the exterior while a heating medium may be supplied to a bladder within the tire as well so that the combined heating effect will be sufficient to bring about vulcanization and the ultimate shaping of the tire.

In general, the vulcanization duration of tire bodies in presses having such vulcanization forms is controlled by timers which established fixed, although selected, heating periods.

During the operation of the press, however, fluctuations occur in the operating conditions and these include especially temperature variations of the heating fluid medium which is employed, usually superheated steam-heated water or hot gases, and these fluctuations are not considered or taken into account in normal operations.

When controls are provided to respond to such fluctuations, they are intended primarily to ensure the appropriate minimum heating necessary to avoid underheating or incomplete vulcanization and do not prevent overheating which may contribute to a reduction of the quality of the product or result in a waste of energy and an increase in cost.

It has been proposed to monitor the heating operation utilizing a temperature sensor which can be introduced into the tire blank or body, but because of mechanical disturbances, especially for closure of the press and the breaking out of the tire after vulcanization has been complete, can damage the sensor or interfere with an effective monitoring.

OBJECTS OF THE INVENTION

It is, therefore, the principal object of the present to provide an improved tire vulcanization method whereby disadvantages of the earlier systems are avoided.

Another object of our invention is to provide a method of operating a tire-vulcanization press which allows a more effective monitoring of the vulcanization process without endangering sensors and without requiring special sensors which must be inserted into the tire body as has hitherto been the case.

It is also an object of the invention to provide a method of controlling the heating time of a press of the type described so that the vulcanization process can be carried out under the currently most optimal conditions possible.

SUMMARY OF THE INVENTION

These objects and others which will become apparent hereinafter are attained, in accordance with the present invention, in a method of controlling a vulcanization process of the aforedescribed type wherein, at time-spaced intervals of 1 to 40 seconds (periodically and preferably at intervals of 1 to 10 seconds), the quantities of heat delivered by the heating media to the vulvanization form and to the interior of the body or blank are measured, e.g. in the form of temperature measurements, and the results are integrated with time or added and are calculated with reference to the initial temperature of the body which is also ascertained and the integrated or added value of the heat supplied is compared to a predetermined value of the required vulcanization total heat quantity and the vulcanization terminated upon correspondence between the actual supplied thermal quantity equalling the quantity of heat required for vulcanization. The former value is, of course, a summation of the increments of heat supplied as detected by the periodic measurements.

According to the invention, the heat supplied is determined by measuring the change in temperature of the heating medium, i.e. by measurement of the temperature differential between the inlet and outlet temperatures of the heating medium delivered to the form and the heating medium delivered to the bladder within the tire body, respectively.

Utilizing these temperature measurements as an indication of the increments of heat supplied, we are able to monitor the vulcanization to ensure complete vulcanization in each case while terminating the vulcanization process before excessive heating, which may be detrimental, can occur.

The products produced in the process of the present invention are thus more uniform and the overall quantity of the product is improved by comparison with prior art systems.

To reduce the thermal loss in the vulcanization form, the temperature measurement can be effected by a sensor which can be disposed in the form in direct proximity to a surface of the form turned toward the body or the blank.

The evaluation of the temperature at the blank can be made empirically with concern only for the losses in the relatively small distance between the sensor and the rubber body.

Preferably, however, the temperature measurements include at least one measurement of the respective heating media supplied to the form or to the bladder. The advantage of this approach is that only the heating-medium temperatures at the form and the bladder need be measured and added and the temperature measurements can be effected wholly externally of the form. In this case, it is preferred to measure the inlet and outlet temperatures of the heating medium for the bladder and the form respectively, so that the differential may be utilized to calculate the heat supplied to the vulcanization form, the measurement of the heating medium outlet temperature enabling monitoring of the process to avoid overheating.

The values for the optimum vulcanization time are, of course, the total heat quantities required for a complete vulcanization of the entire tire blank or body throughout its thickness and will vary in accordance with its geometric form, the tire type and the composition of the material to be vulcanized. The critical point is, of course, the point between the permissible vulcanized out condition and the completely vulcanized state for a particular tire type and it is the total heat required to reach the critical state which must be the minimum supplied. The determinations of these quantities of heat can be effected empirically and based upon the knowledge that the different regions of a tire body or blank are heated at different rates during the vulcanization. It suffices to supply the total vulcanization heat required to bring the slowest-to-heat portion of the tire to the requisite critical point if one wishes to ensure total vulcanization. The values are determined experimentally in trial heats.

In other words, we can establish for a given tire type and composition, size and vulcanization mold, the total quantity of heat which must be supplied or, for that matter, the temperature-change pattern which must be generated over a course of time and can program this data into a memory of the control computer or can provide this data on tables which can be input to the control computer through a terminal or a particular vulcanization operation. When tests are made on various tire types, sizes and compositions, values between the optimal values for the tires for which actual tests are made can be determined by interpolation, e.g. via the computer.

Since only the portion of the heat supplied to the press which is transferred to the tire blank or body is effective during the vulcanization process, it may be necessary to calculate or program the computer to take into consideration the heat losses which arise in controlling the heating time. It should be noted, however, that the heat quantity transferred to the tire body may vary depending upon the operating conditions.

According to the invention, the dependency or the law relating the supplied heat to the heat transferred to the tire body can also be determined and programmed into the computer so that it can be utilized in participating in calculating the vulcanization time. The law can be established simply by test heatings and temperature measurements across the walls, etc. The dependency or law and the empirically determined parameters thus establish a basic data file which can be read as required to permit a comparison.

The computer can be built into the vulcanization press or can be provided as a separate computer or calculator or with a separate computer or calculator which can be provided with programming data and any requisite empirical data for transfer to the microprocessor or other process calculator. In the latter case, plug compatibility can be provided between the controller of the press and the computer or portions thereof.

According to another feature of the invention utilizing the principles described, the temperature-characteristic curve of the tire body, empirically determined, can be utilized as a basis for establishing the optimum heating and the heat quantity which must be supplied to attain the desired degree of vulcanization and this can be programmed into the computer or processer.

The term "vulcanization form" is here used to refer to the tire-shaping unit with or without accessories which is utilized to heat the tire body or blank from its interior outwardly. When, for example, the form does not include a heating bladder or comparable accessories, the form itself will engage the interior of the body or the blank. The bladder, when provided, is therefore treated as part of the form when the latter term is used in its most general sense.

According to another feature of the invention, means is provided to generate an alarm signal to respond to deviations beyond predetermined limits from predetermined heating-medium inlet or outlet temperatures, thereby preventing drastic errors in the operating parameters from causing damage to the tires or disruption of the vulcanization process.

The invention is applicable to all types of vulcanization forms and in particular, to multipartite vulcanization forms which can be centrally divided, i.e. provided with upper and lower half shells, or even segmented heated forms in which the body is received between the form segments and side walls cooperating with the segments.

The invention can be used with or without heating bladders and in the case in which heated form segments, side walls and a heating bladder are provided, the process of the invention is so effected that the heat quantities incrementally supplied to the assembly of the form segments, the form side parts and the heating bladder and transferred to the tire blank or body, are determined at intervals by measurements which follow one another of the heating medium inlet and outlet temperatures at the respective parts.

The press for carrying out the process of the invention is provided with means for determining inlet and outlet temperatures of the heating medium to the various parts, and means for detecting the temperature of the tire blank or body initially. The press can be provided with a heating bladder and in that case, for each press part temperature sensors are provided for the respective temperature measurements.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
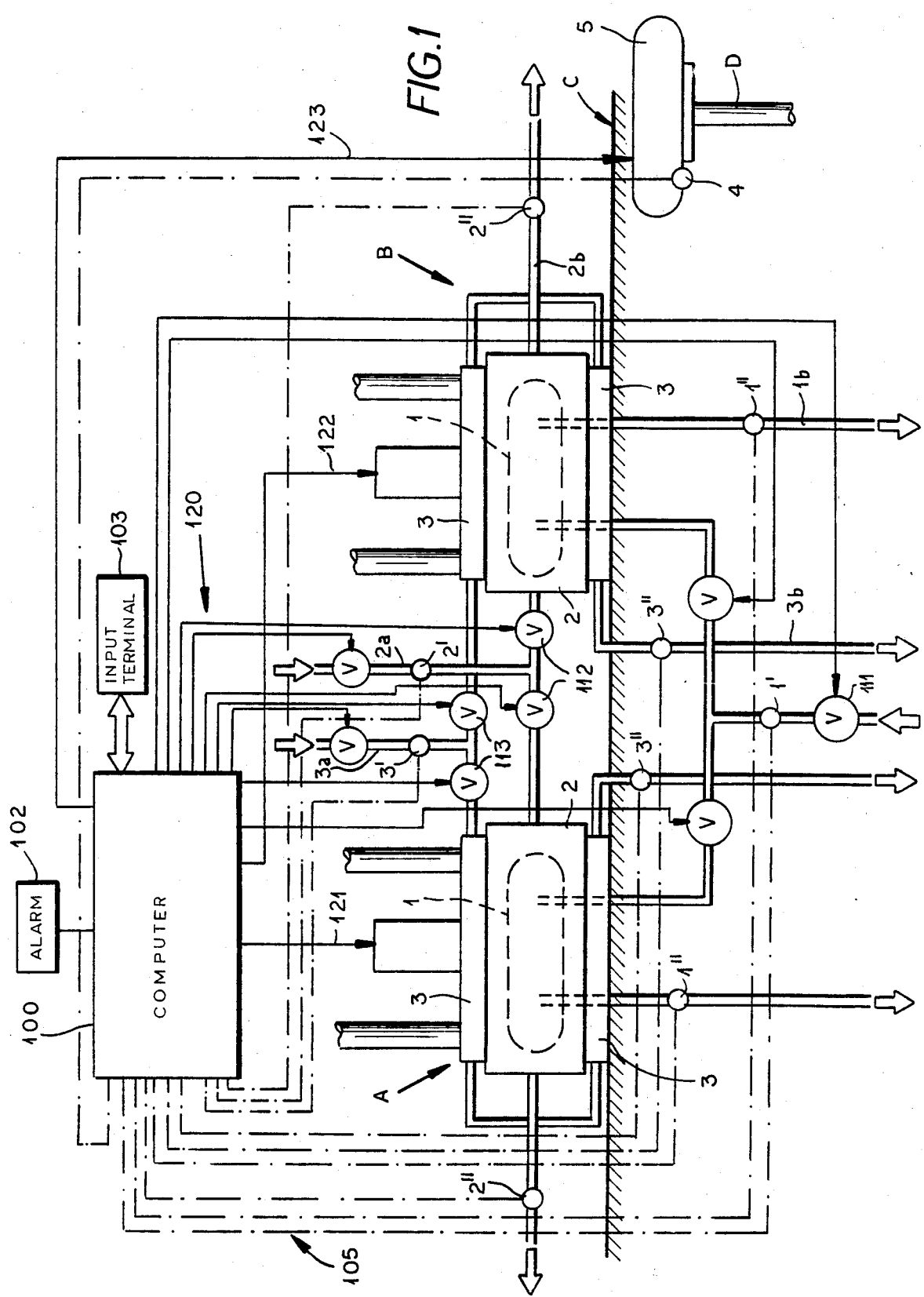
FIG. 1 is a diagram in elevation of a two-press plant for carrying out the method of the invention.

In the drawing we show a press installation in which two vulcanization forms A and B are provided upon a support structure represented at C which is provided with the piping and the like for the heating medium and which can be alternately charged and discharged and can cooperate with the charging unit represented generally at D delivering a tire body or blank 5 to the form to be charged.

The mechanisms for opening and closing the forms, the heating bladders within the tire bodies of the forms, and the specific constructions of the forms have not been illustrated since, as indicated earlier, any standard form construction can be used. The forms can be of segmented or centrally separated type and in the drawing the form segments have been represented at 2 and are shown to cooperate with form side walls 3 defining the outer contour of the pneumatic tire to be formed. The heating of the forms from the interior outwardly is effected by the delivery of the heating medium to the bladder or to the interior of the form represented in broken lines in FIG. 1.

For discussion purposes, this region can be considered to be a heating bladder.

The supply of the heating medium to the parts 1, 2 and 3 for the vulcanization process is effected via respective heating medium ducts 1a, 2a and 3a, respectively, and in the case of double-heat presses, each supplies both the vulcanization form A and the vulcanization form B.

The heating-fluid lines extending away from the respective parts have been represented at 1b, 2b and 3b, respectively.

Figure 6:
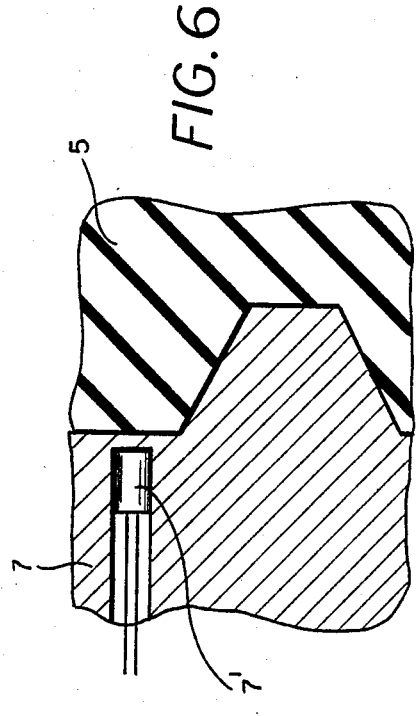
FIG. 6 is a cross-sectional view showing another embodiment of a sensor which can be utilized to provide an input to the computer of FIG. 5.

The measuring points for the determination of temperature as inputs to the computer are shown at 1' for the inlet super-heated steam supplied to the bladder, at 1" for the superheated-steam outlet from the bladder, at 2' for the inlet to the form segments of the heating medium, at 2" for the outlets of the heating medium from the form segments and at 3' and 3", respectively, for the inlet and outlet of the heating medium with respect to the side walls 3 of the form. An additional heating-level or temperature input is derived from the sensor 4. This supplies, by contact with the tire body or blank the temperature of the latter to the process controller or computer The temperature sensors 1', 1", 2', 2", 3', 3" can be similarly applied to other types of processes and, for example, as shown in FIG. 6, a form part 7 directly adjoining the tire body 5 can be provided with a temperature sensor 7' if desired.

When other types of process are used, i.e. process with upper and lower half shells of the centrally divided type, corresponding sensors can be provided and the invention is also independent of the nature and type of internal heating, i.e. can operate without the heating bladder as well.

In centrally divided vulcanization forms operating without a heating bladder, temperature measurements are made at points at which the measured temperature can indicate the heat delivered to both the interior and exterior of the tire body.

The temperature curve within the tire body has previously been detected at least in the region of the critical point during which vulcanization is effected with minimum temperature increase. The latter curve is for example given by the upper bowed curve i of FIG. 2 in which the temperature characteristic is plotted along the ordinate in degrees centigrade versus time plotted along the abscissa. This characteristic is the characteristic for the inner wall tire body. The curve $\theta_R$ located therebelow represents the characteristic for the interior of the tire body and the relatively flat curve $\theta_a$ represents the curve for the outer wall of this body.

The curves for the temperature of the inner wall of the tire body and the outer wall thereof correspond at least approximately to the curves for the heating bladder and the form wall in contact with the outer surface of the tire body, respectively.

Figure 3:
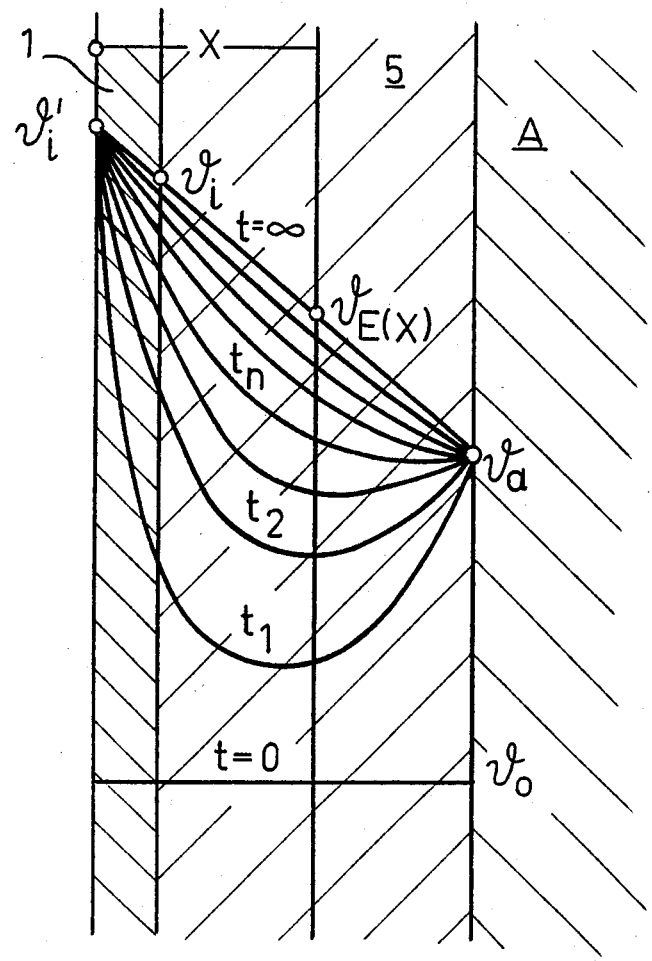

FIG. 3 shows diagrammatically the temperature characteristic within the wall of a tire body 5 between the heating bladder 1 and the surface of the vulcanization form on the opposite side thereof. In this case, the curves have been shown at different points in time starting at time t=0 at which the vulcanization process commences with the values being illustrated at the times $t_1$, $t_2$, $t_n$ and extending to the theoretical or extrapolated steady-state point at t=∞. In this Figure, $\theta_i$ is the inner wall temperature of the heating bladder, $\theta_j$ is the outer wall temperature of the heating bladder, $\theta_a$ is the surface temperature of the vulcanization form and $\theta_o$ is the starting temperature of the tire blank. $\theta_{E(x)}$ is the steady-state temperature at x.

Figure 4:
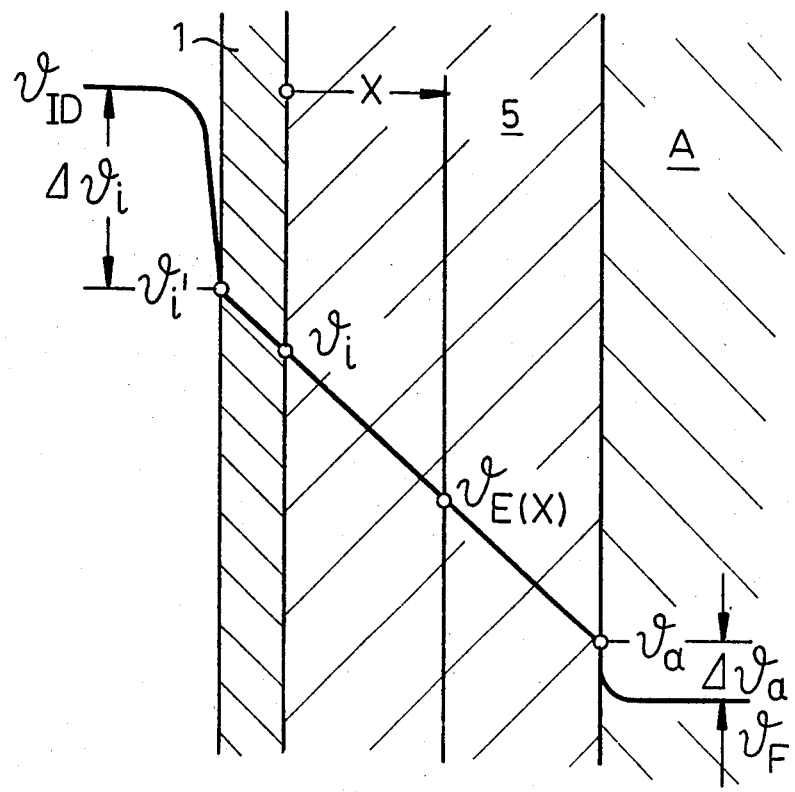
Figure 5:
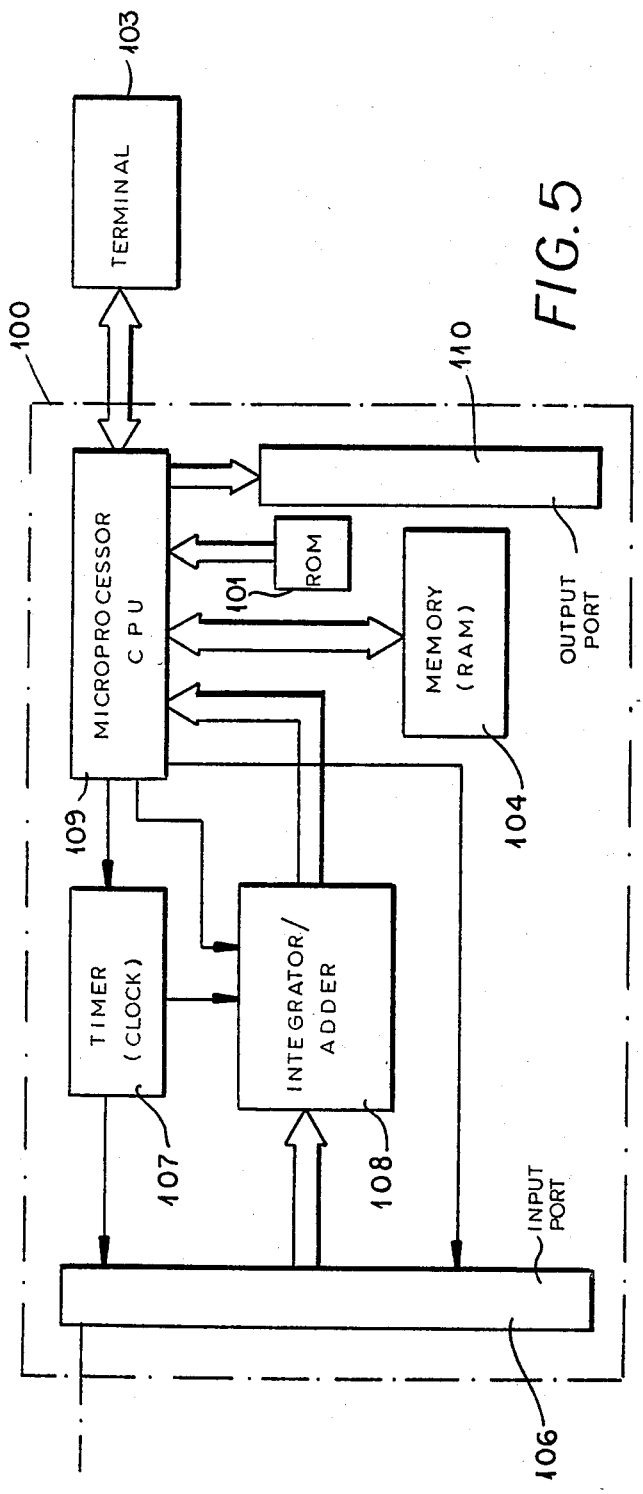
FIG. 5 is a block diagram of a computer facility which can be used with the apparatus of FIG. 1.

The relationship of the parts shown in FIG. 3 has been repeated in FIG. 4 with only the temperature gradient at T=∞ (steady state) being illustrated.

The significant points along the temperature gradient (temperature being applied vertically in the Figure) are the following: ID is the internal steam temperature of the bladder, $\theta_F$ is the temperature of the vulcanization form, $\theta_i$ is the inner wall temperature of the bladder, $\theta_j$ is the outer wall temperature of the bladder, $\theta_a$ is the surface temperature of the vulcanization form $\theta_{E(x)}$ is the steady-state temperature at point x starting from the inner wall of the tire body 5 in the direction of the surface of the vulcanization form A.

The temperature difference between the superheated-steam temperature in the interior of the heating bladder and its inner wall temperature on the one hand and between the temperature at the surface of the vulcanization form and the temperature of the vulcanization form on the other hand are designated with $\Delta_i$ and $\Delta_a$ respectively.

Figure 2:
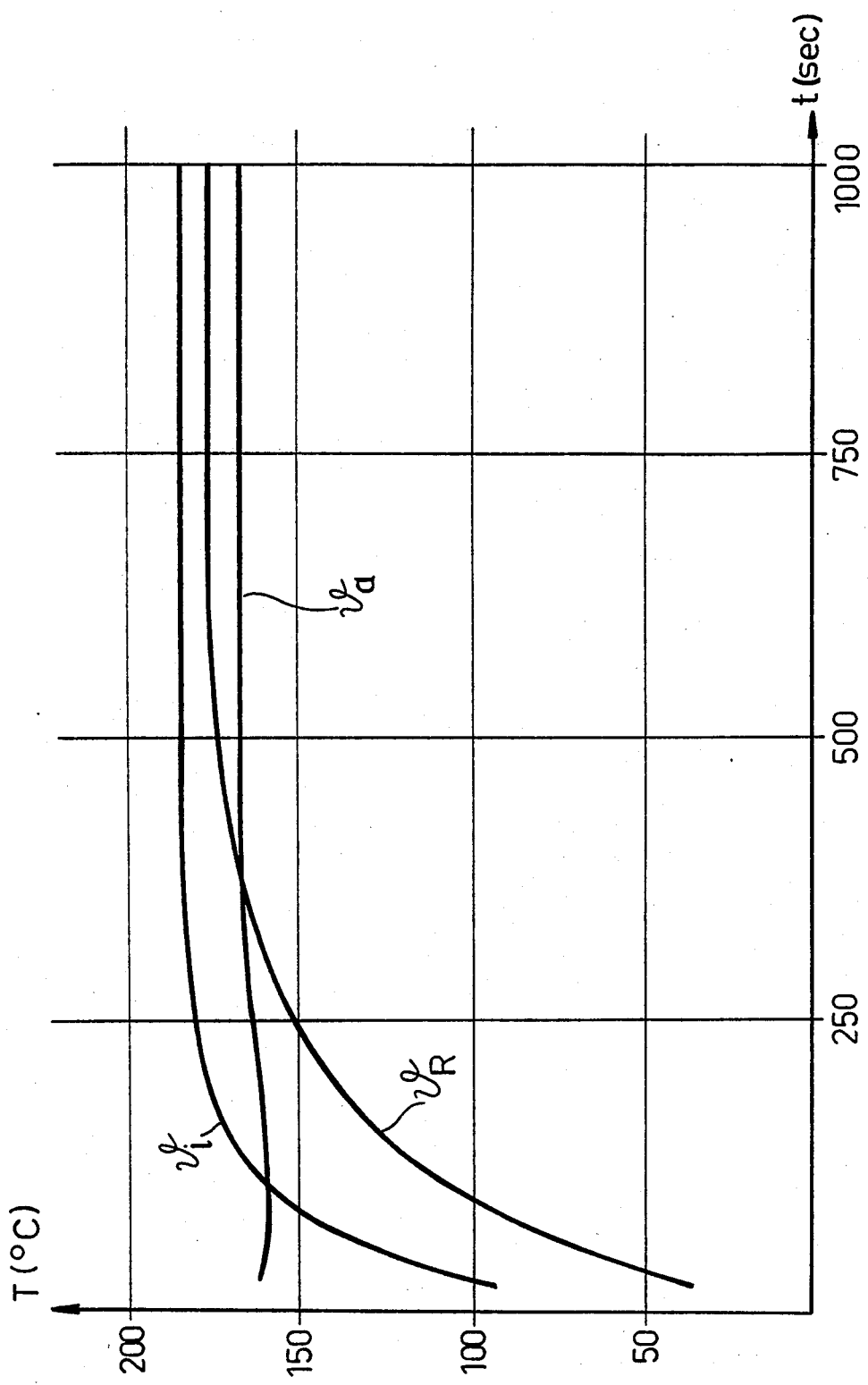
FIGS. 2–4 are graphical illustrations of temperature characteristics discussed in connection with the invention.

From the temperature characteristics shown in FIGS. 2–4, it will be apparent that the temperature measurements taken by the sensors can be related to the temperature at the critical locations in the tire body 5 in accordance with empirically determined laws or based upon empirically derived tabulated data and hence the total heat required for vulcanization of the tire body can be determined in terms of the temperature differentials of the heating medium and the absolute temperatures at the inlets and outlets to the form parts. According to the invention, this data can be introduced in a plug compatible or interchangeable read-only memory 101 of the computer 100 which is utilized to control the installation. This computer may be provided with an alarm 102 to signal a deviation of any measured temperature from preset limits as previously described and an input terminal 103 which can input data such as the laws and empirical data described. The input terminal 103 can also be used to instruct the computer to select previously stored data from a large scale storage such as the random access memory 104.

The temperature signals from the sensors 1', 1"... 4 are supplied at 105 through an input port 106 to the computer which may be provided with an analog/digital circuit and any multiplexing system for scanning the temperature input lines which may be desired. A clock 107 provides clock pulses for scanning the temperatures periodically, e.g. at intervals of 1 to 40 seconds and preferably 1 to 10 seconds, the temperature data being integrated or added, preferably in the form of temperature differentials and input heat medium temperatures in the adder circuit 108. The various circuits are controlled by the microprocessor-based central pressing unit 109 and the output of the latter controls output port 110 which delivers to the lines 120 controlling valves 111, 112 and 113, signals the cutoff of the heating-medium flow when vulcanization is complete. Form opening signals may be delivered at 121 and 122 and tire blank change signals supplied as represented at 123.

The computer, of course, utilizes the integrated values to calculate the increments of heat supplied and adds the heat increments to establish the actual value of the total heat supplied to the tire, comparing it with the calculated value from the empirical data and programmed laws to cut off the vulcanization process when the total heat supplied is equal to the required total heat for vulcanization.

We claim:

1. In a method of operating a tire-vulcanizing press in which a processed tire body is received in a vulcanizing form and a heating medium is delivered to said form to heat said body which requires a certain predetermined total heat quantity for a desired degree of vulcanization, the improvement which comprises the steps of:

determining the temperature of said body prior to vulcanization;

taking temperature measurements at intervals of 1 to 40 seconds of at least one temperature generated by said medium and related to the transfer to heat of said body and representing increments of heat transmitted to said body when related to a measurement of the temperature of said body prior to vulcanization;

continuously adding said measurements during the course of vulcanization;

comparing the summation of said measurements continuously with a value representing said total heat quantity;

terminating vulcanization by computer control upon the summation equalling said value; and empirically determining and storing a plurality of values representing total heat quantities for a multiplicity of different bodies in dependence upon their respective compositions, tire type and geometric shape in the form of heat quantities required to bring the respective bodies to respective critical points by running test heatings of the different bodies of a variety of compositions and geometric shapes and interpolating between the results obtained by these test heatings, the increments of heat transmitted to said processed body being established relative to said measurements in accordance with the relationships defining heat transfer between said medium and the interior of each body to serve as basis values for said computer control of the vulcanization process.

2. The improvement defined in claim 1 wherein said measurements are taken at intervals of substantially 1 to 10 seconds.

3. The improvement defined in claim 1 wherein said at least one temperature is a temperature of the heating medium at said form.

4. The improvement defined in claim 1 wherein a first heating medium is introduced into the interior of said processed body in said processed form and a second heating medium is introduced into said form in contact with outer surfaces of said processed body, temperatures of each of said heating mediums being measured to represent said increments of heat transmitted to said processed body.

5. The improvement defined in claim 4 wherein the temperature of each of said heating mediums is measured upstream of said processed body and again downstream of said processed body to establish said processed increments of heat transmitted to said processed body.

6. The improvement defined in claim 1, further comprising the step of triggering an alarm signal upon said one temperature deviating from a predetermined range.

7. The improvement defined in claim 1 wherein the taking of the temperature measurements, the continuous addition of said measurements, the comparing of the terminating of vulcanization are all carried out automatically.

* * * * *